F. B. Kendall,
Reciprocating Saw-Mill,
Nº 16,876. Patented Mar. 24, 1857.
Sheet 1-2 Sheets.
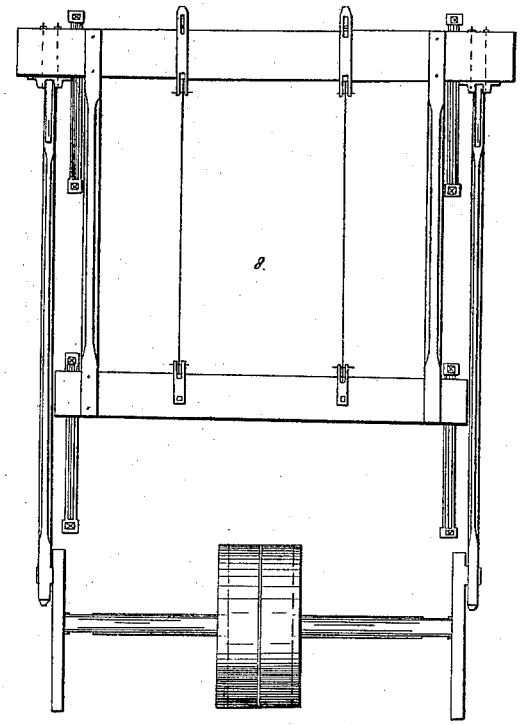

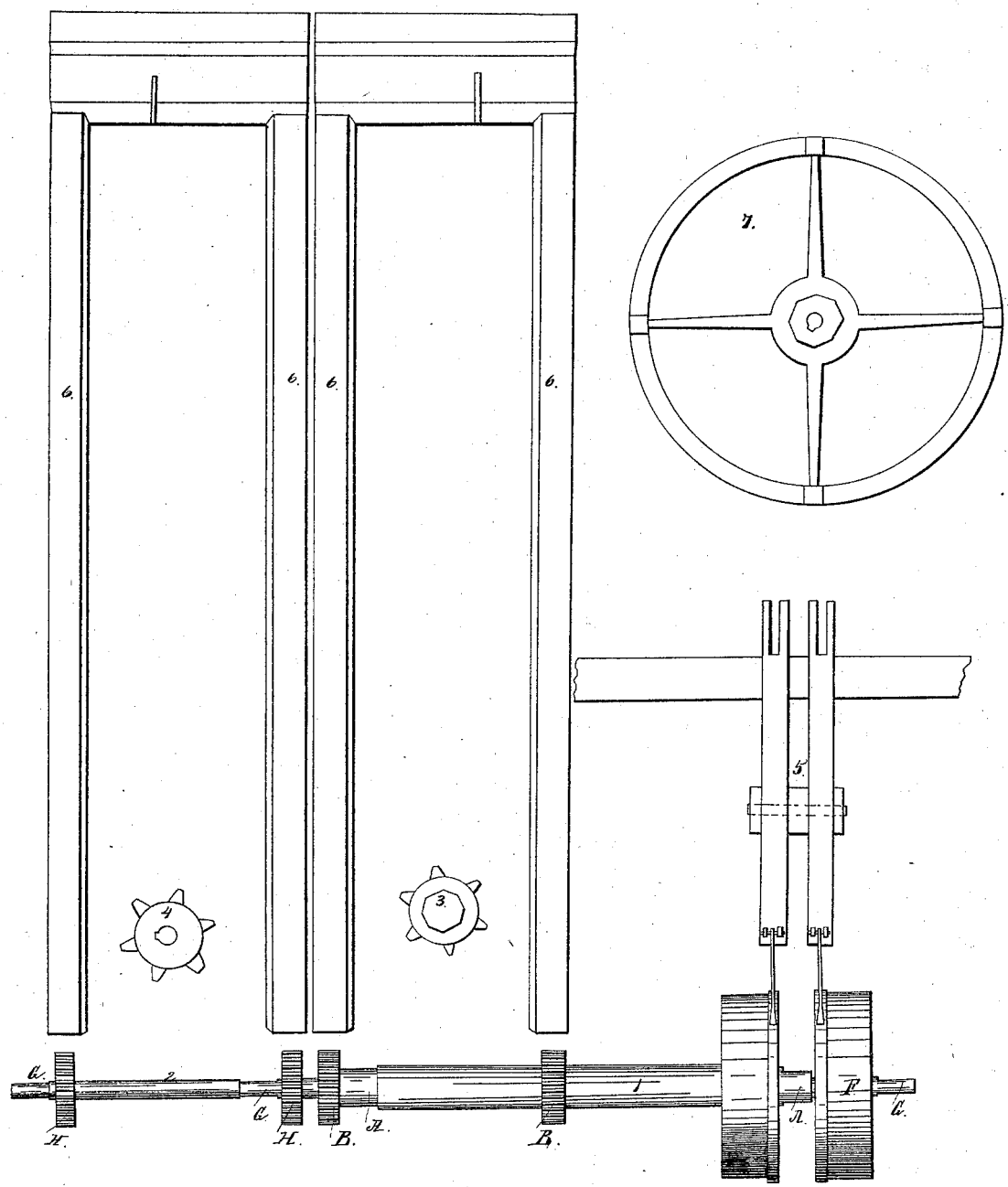

UNITED STATES PATENT OFFICE.

FRANKLIN B. KENDALL, OF BATH, MAINE.

METHOD OF OPERATING DOUBLE CARRIAGES IN SAWMILLS.

Specification of Letters Patent No. 16,876, dated March 24, 1857.

*To all whom it may concern:*

Be it known that I, FRANKLIN B. KENDALL, of Bath, in the county of Sagadahoc, State of Maine, have invented a new and useful improvement in the methods of manufacturing lumber by the use of double carriages or sets running through one frame and the manner of feeding or running back each carriage independently of the other.

The improvement consists in the use and application of double carriage sets to saw mills with an improvement in the use and construction of two carriage shafts one hollow and the other solid, the solid one on the same line and extending through the hollow one so that each shaft in its connection with the carriage set will move the same independent of the other, each shaft having a cog or band wheel permanently affixed to the end both occupying a very compact space, also the application of double feed posts the same being hung in one frame in a manner to occupy but little more space than common feeding gear.

No. 1 is the carriage shaft which should be cast with a hole through it about 4 inches in diameter and about 5½ diameter outside to be cast in squares when the feed wheels and pinions are fastened. A A are bearings to run in boxes. B B are pinions to move the carriages.

No. 2 is the carriage shaft running through shaft No. 1, is wrought iron about 3 inches diameter which has three bearings G G G. F, is feed wheel H, H are pinions.

No. 3 is the form of the pinion on the inside that goes with No. 1 shaft, it should be cast ¾ of an inch larger in diameter than the shaft for the purpose of fastening on with wooden wedges.

No. 4 is the form of the pinion to go with the shaft No. 2 (for the purpose of fastening to the shaft a steel or iron key will have to be used). The number of cogs in the pinions are to be cast to the different forms of gear.

No. 5 shows the feed posts with hands resting on the ratchet iron.

No. 6 are the two carriage sets.

No. 7 is the form of the spider to fasten the feed wheel to.

No. 8 is the saw frame, &c.

In order to apply the above improvement I would recommend that the following plan be adopted. For the moving power any mode by which a horizontal shaft may be set in motion, said shaft to be firmly secured in its bearings with a tight and loose pulley similar to steam mills in common use, the shaft to have a crank on each end with sufficient weight opposite the crank pin to balance the saw frame, said shaft to be laid under the saw frame and above water (if a water mill) with two sweeps attached, the one to either crank and the upper ends to the upper girt in the saw frame, the girts being projected for the purpose of removing them, the moving power to be the same as in common use—but for the convenience of running other machines I would recommend the common drum and shaft and gears in use. A band from the leading drum is applied to the drum between the cranks with an inclined plane over the drum and under the saw to convey the saw dust and other matter clear from the drums and bands or gear as the case may be, the cranks, shafts, sweeps, drums, bands, &c., being placed above the water are rendered more durable and avoid all decomposition by rust or rot caused by water. If water power be applied one water wheel only being necessary instead of six or seven, the sweeps, drums, boxes, fastenings, &c., when thus placed are accessible at all times and conveniently situated for adjustment.

The two side sweeps give a regular and even motion to the saw frames without racking the frames and with very little friction. The crank pins should be cast hollow or bored for the purpose of preventing heat by friction and putting in tallow or oil and corked. Having obtained the up and down motion the next in order is the application of my improvements. The saw frame should be about eight feet wide for the purpose of hanging in two saws and allowing two carriage sets to traverse free in their backward and forward movements. I substitute two feed wheels instead of one, the shafts of which lay across beneath the carriage sets on a line in the usual manner. One being hollow extends the width of one carriage set with the proper fixtures of feed wheels with cogs or cams attached to operate in its connection with one carriage set in its back and forward movement. The other being of wrought iron extends through the hollow center of the first across beneath the other carriage set, this being hung free from the other on three bearings, also the appropriate fixtures of cogs or cams and feed wheels working readily in connection with the other carriage set in its backward and forward movements.

Some of the advantages of this improvement over the old or common method will be perceived by a comparison. The expense of two saws geared on this plan will be but little if any more than gearing a single mill on the old plan. It occupies not much more space. That fifty or seventy-five per cent. more lumber may be sawed at the same time and with the same power, and to accomplish an equal amount of business with a common double mill not a third additional amount of power will be required thus being nearly the whole of the gearing of one mill less to be kept in motion. It has all of the advantages of the common double mill contained in a single mill, thereby doubling the value without adding but little to the cost and little to the power. It applies particularly to up and down saws. Experience teaches that to saw lumber to the best advantage a thin saw hung and strained in a frame is the best implement, one thousand feet in sixteen being saved for a sixteenth of an inch less saw scarf. It will also apply to the old way of a horizontal wheel and single sweep by spreading the top of the sweep and connecting with the same frame at the lower girt in two places. It can be worked by a less number of hands than a common double mill, less light in the night time is required, the same light required for a single mill is amply sufficient for this. It brings the men nearer together and in consequence the lumber can be handled quicker and with more ease than if separated into two crews across a wide mill. The saw wheels will not run light so much or out of the cut, thereby avoiding the accelerated speed which so causes damage to the gear in some of its parts by breaking, one or the other of the saws being constantly in the cut with perhaps rare exceptions. Consequently more lumber can be sawed with less expense in running, less liability to get out of order, less expense in gearing, &c.

I do not claim operating double sets of carriages broadly; but

I do claim—

Combining the devices in the manner shown and set forth, for the purposes above stated.

FRANKLIN B. KENDALL.

Witnesses:
  JOHN F. MEREEN,
  WILLIAM O. BATES.